(12) United States Patent
Dragoni et al.

(10) Patent No.: US 6,886,597 B2
(45) Date of Patent: May 3, 2005

(54) PROPORTIONAL ELECTROVALVE FOR MOTOR COOLING LIQUID CIRCUIT

(75) Inventors: Christian Dragoni, Alpes-Maritimes (FR); Emmanuel Hermet, Vallauris (FR); Michel Hernandez, Alpes-Maritimes (FR); Francois Rosaz, Alpes-Maritimes (FR)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/450,180

(22) PCT Filed: Dec. 3, 2001

(86) PCT No.: PCT/FR01/03812

§ 371 (c)(1),
(2), (4) Date: Nov. 13, 2003

(87) PCT Pub. No.: WO02/44600

PCT Pub. Date: Jun. 6, 2002

(65) Prior Publication Data

US 2004/0094215 A1 May 20, 2004

(30) Foreign Application Priority Data

Dec. 1, 2000 (FR) .......................................... 00 15622

(51) Int. Cl.$^7$ .............................................. F16K 11/10
(52) U.S. Cl. ............................... 137/625.33; 251/129.15
(58) Field of Search ........................ 137/625.33, 136.2; 251/129.15

(56) References Cited

U.S. PATENT DOCUMENTS

| | | | | |
|---|---|---|---|---|
| 4,610,267 A | * | 9/1986 | Beck et al. ............. | 137/596.17 |
| 5,487,410 A | * | 1/1996 | Niethammer .......... | 251/129.15 |
| 6,076,490 A | * | 6/2000 | Esch et al. ............. | 251/129.15 |
| 6,380,832 B2 | * | 4/2002 | Oyama et al. ......... | 251/129.15 |
| 6,409,144 B1 | * | 6/2002 | Inami ......................... | 251/318 |

* cited by examiner

*Primary Examiner*—John Fox
(74) *Attorney, Agent, or Firm*—Roger A. Johnston

(57) ABSTRACT

The invention concerns an electrovalve proportional to a field current supplying the field coil (5) axially enclosing a mobile core (76), whereto is secured a push rod (16) sliding in a polar component (9) of the fixed magnetic circuit co-operating with the field coil, actuating a shutter (2, 3) comprising at least a valve (25, 26) co-operating with a seat (28, 29) to open and close the shutter, return means (32, 33) providing it with a stable neutral position relative to the seal when the field current is null, each valve being coaxial to the push rod and actuated thereby. The invention is characterized in that the mechanical linkage between the stem of each valve (17, 27) and, either the stem of the adjacent valve, or the push rod, constitutes a punctual contact.

16 Claims, 3 Drawing Sheets

PROPORTIONAL ELECTROVALVE FOR MOTOR COOLING LIQUID CIRCUIT

The present invention relates to a solenoid valve (electrovalve) that has a proportional response to a signal supplied in the form of an inductor current to the coil of the electromagnet on which said solenoid valve is based. According to a preferred example that will serve as a common thread through the description, such a solenoid valve is intended to be used to control the flow rate of the cooling fluid in a motor vehicle engine.

Hitherto, in most cases, the flow rate of heat transfer fluid in a combustion engine has been controlled by a device of the valve type that is closed when the liquid is cold, and that opens when the liquid begins to heat up. The opening of the valve is therefore linked to the temperature of the cooling liquid.

The only condition taken into consideration in changing the position of the valve is therefore the temperature of the cooling liquid, there being no external control applied. In known devices, the precision with which the flow rate is controlled is also limited because the system used is, from a technical viewpoint, fairly primitive. Finally, their operation entails a minimum flow rate, because it is not possible to completely halt the passage of the liquid.

The efficiency and operation of the motor vehicle engine, and of all the associated functions using the heat transfer fluid, may, however, be improved by using a device that is not autonomous, unlike current practice, but that allows the fluid flow rate to be controlled on the basis of the engine operating conditions.

This is the chief objective of the present invention.

More specifically, the object of this invention is to propose a device that can be controlled by the vehicle computer, allowing a great many parameters to be taken into consideration in the logic of controlling the flow rate of the cooling liquid. Thus, apart from the temperature of the liquid, the solenoid valve of the invention will be able to be controlled more finely using parameters such as the engine speed, the vehicle speed, the temperature of the engine at various locations, or alternatively the switching-on of auxiliary systems such as the climate control system.

A further objective of the invention is to propose, in one possible configuration of the invention, a device that uses an electromagnet in which the geometry of the various parts makes it possible to obtain a thrust force that is relatively constant regardless of the magnitude of the air gap, for a given supply current amplitude.

According to yet another objective, the configurations proposed by the invention will not dictate there having to be a minimum flow rate and will, by contrast, allow the valve to be closed completely.

Finally, the solenoid valve of the invention will be able to be built as a functional module of the cartridge type that can be inserted either into a specific interface unit or into an existing part of the motor vehicle.

In order to fulfil these objectives, and others that will become apparent from reading the description that follows, the solenoid valve of the invention, which has mentioned before offers a response that is proportional to an inductor current powering the inductor coil of its electromagnet, essentially comprises such a coil, surrounding an axially moving core plunger to which there is secured a pushrod sliding in a pole piece of the fixed magnetic circuit and collaborating with the inductor coil. It actuates a valve comprising at least one valve shutter collaborating with a seat so as to open and close the valve, return means giving this valve shutter a stable position of rest with respect to the seat when the inductor current is zero. Each valve shutter is coaxial with the pushrod and actuated by it. According to a main feature, the mechanical connection between the shaft of each valve shutter and either the shaft of the adjacent valve shutter or the pushrod is reduced to a point contact.

This specific feature offers an advantage that is of primary importance at the time of assembly because there can be a slight misalignment due to assembly, particularly when there is more than one valve shutter. With this type of construction, correct operation of the valve shutters is unaffected by this misalignment, because of the aforementioned connection between the various parts, which connection is not rigid.

More specifically, the shaft of each valve shutter slides with respect to a valve body in which are made at least one fluid inlet orifice and at least one fluid exhaust orifice, and in which the valve seat is formed.

When several valve shutters (generally two) are arranged one after the other, the point contact applies, on the one hand, between the pushrod and a first valve shutter the body of which is placed in contact with the electromagnet and, on the other hand, between the first and second valve shutters.

As a preference, the means for returning the valve shutter away from the seat consist of a coil spring arranged around the shaft of the valve shutter, in an axial housing thereof, said spring resting on the central part of the seat for the valve shutter.

The presence of these return means is functionally very important because they provide the mechanical cohesion of the assembly.

What actually happens is that the valve bodies are fixed with respect to a casing surrounding the solenoid valve assembly. However, the contact pressure with each of the aforementioned adjacent axial elements is provided at the moving valve shutter, which in actual fact transmits the force applied to it by the spring regardless of the magnetic force conveyed by the pushrod.

According to one possible configuration, the valve shutter and the valve body exhibit symmetry of revolution, the shaft of each valve shutter sliding axially in the valve body the seat of which is orientated roughly at right angles to said axis.

Such a configuration allows optimum transfer of forces, and the simplest possible control over the opening/closure to the passage of fluid.

As a preference, the external wall of the valve body has a peripheral housing designed to house an O-ring.

This O-ring allows each valve body to be fixed to the external casing that forms the jacket of the solenoid valve of the invention. This is as true in the case where the device is mounted in a special-purpose interface unit as it is when it is mounted in an existing part of the motor vehicle, if this is the option chosen.

Apart from this external seal, each valve shutter exhibits a seal that can be termed an internal seal, that provides a very small flow rate of cooling liquid when the device is in the closed position. This is an elastomer seal overmolded onto the portion of its peripheral wall that is designed to come into contact with the seat.

According to one particularly advantageous possibility, the solenoid valve of the invention in fact comprises two coaxial valve shutters the valve bodies of which are superposed along the axis of the pushrod.

This double-valve-shutter principle makes it possible to minimize the forces needed to control the solenoid valve. This construction also makes it possible to reduce the weight and power consumption of the device.

According to one possible configuration, the two valve shutters are kept by the return means away from their respective seats when the inductor current is zero.

As a preference, the two assemblies made up of the valve shutters and of their respective bodies are screwed together.

Such an assembly ensures the possibility of precise adjustment between the two assembles, so as to obtain simultaneous closure of the two valve shutters, and therefore a very low flow rate of cooling liquid when the device is in the closed position.

Also as a preference, the assemblies made up of the valve shutters and of their respective bodies are identical and made of the same material.

According to one possibility, the main material of which these assemblies are made is polyamide.

In general, it should be noted that the device described hereinabove is normally open, which means that, when the electrical power supply to the device is cut off, the solenoid valve returns to the position in which the valve shutters are wide open, thus reducing the risk of combustion engine failure.

The magnetic circuit collaborating with the inductor coil comprises, apart from the moving core plunger, two fixed pole pieces appearing to be coaxial with the core plunger, and between which the latter slides, the pole piece in which the pushrod slides and the core plunger exhibiting, in the region defining their air gap, respective shapes making it possible to obtain a thrust force that is substantially constant regardless of the distance of the air gap, for a given magnitude of the inductor current.

This configuration makes it possible to achieve optimum precision and optimum control of the flow rate, and precision on the position of the moving parts of the device in intermediate states between wide open and fully closed.

More specifically, the moving magnetic core plunger has cylindrical geometry, the pole piece in which the pushrod slides being equipped on its side facing said core plunger with a cylindrical housing of a diameter greater than that of the core plunger, defining two perpendicular orientations for the air gap when the core plunger enters said housing.

This type of configuration plays upon the fact that the force of attraction between the moving core plunger and the pole piece is linked to the lines of magnetic flux at the air gap. Now, only the axial component of the lines of flux contributes to the force used to close the valve. In consequence, the use of such a configuration, diverting an increasing part of the lines of flux in a direction appearing perpendicular to the axis of sliding, makes it possible to obtain a force that is constant over a significant range of the travel.

This configuration is not, however, always desired. Thus, according to one possibility, the solenoid valve of the invention may have just one valve shutter sliding in its valve body. It may also be provided with a magnetic circuit collaborating with the inductor coil which comprises, apart from the moving core plunger, two fixed pole pieces appearing to be coaxial with said core plunger, and between which the latter slides, the pole piece in which the pushrod slides and the moving core plunger exhibiting, in the region defining their air gap, respective shapes making it possible to obtain a thrust force that increases when the air gap distance decreases, for a given magnitude of the inductor current.

This is the case when proportional control of the cooling liquid is not needed, on or off control being, by contrast, sufficient. In this case, the electromagnet is modified to increase the force supplied near valve closure, so as to reduce the leakage in the valve-closed position.

In such a configuration, the facing surfaces belonging to the pole piece in which the pushrod slides and belonging to the moving core plunger, and defining their air gap, are of parallel appearance.

The invention also has other functional possibilities aimed at optimizing its behavior. Thus, the initial position of the moving core plunger, when the inductor current is zero, can be adjusted using a screw accessible from outside the solenoid valve casing and that alters the compression of a spring arranged between it and the moving core plunger, the return force of said spring being exerted axially toward the pole piece in which the pushrod slides.

This construction in particular allows the device to be calibrated when it is being assembled, or recalibrated in the event of a problem or a change to the operation.

According to one possibility, the moving core plunger also comprises means for filtering out external vibrations likely to cause the moving parts to move in a way unrelated to the operating current.

More specifically, said filtering means consist of an axial duct made in the moving core plunger, connecting two chambers that are defined between the latter and the fixed pole pieces, inside the coil, said chambers being filled with a cooling liquid that passes from one chamber to the other via the duct in the core plunger should the latter move.

The solenoid valve of the invention can actually be used in environments that are potentially subject to strong vibrations. These external vibrations are of course parasitic to the operation of the device and have to be filtered out. For this, use is made of the possibility of passing fluid between the two chambers, by means of what has come to be known as a hydraulic restriction in the electromagnet. As the core plunger moves, the cooling liquid is forced to pass from one chamber to the other, and the cross section of the duct slows the rate of travel of the core plunger. The passage cross section of said duct in the core plunger is chosen to filter out the high-speed movements resulting from the vibrations encountered and likely to disturb the correct operation of the device.

In general, the solenoid valve of the invention can be built into a device for controlling the flow rate of a fluid, either in the form of a cartridge, by forming an external component that can be incorporated into a special-purpose interface, or directly into the structure of the engine of the motor vehicle, for example as a replacement for a valve of the prior art.

The invention will now be described in greater detail with reference to the attached figures in which.

Figure 1:
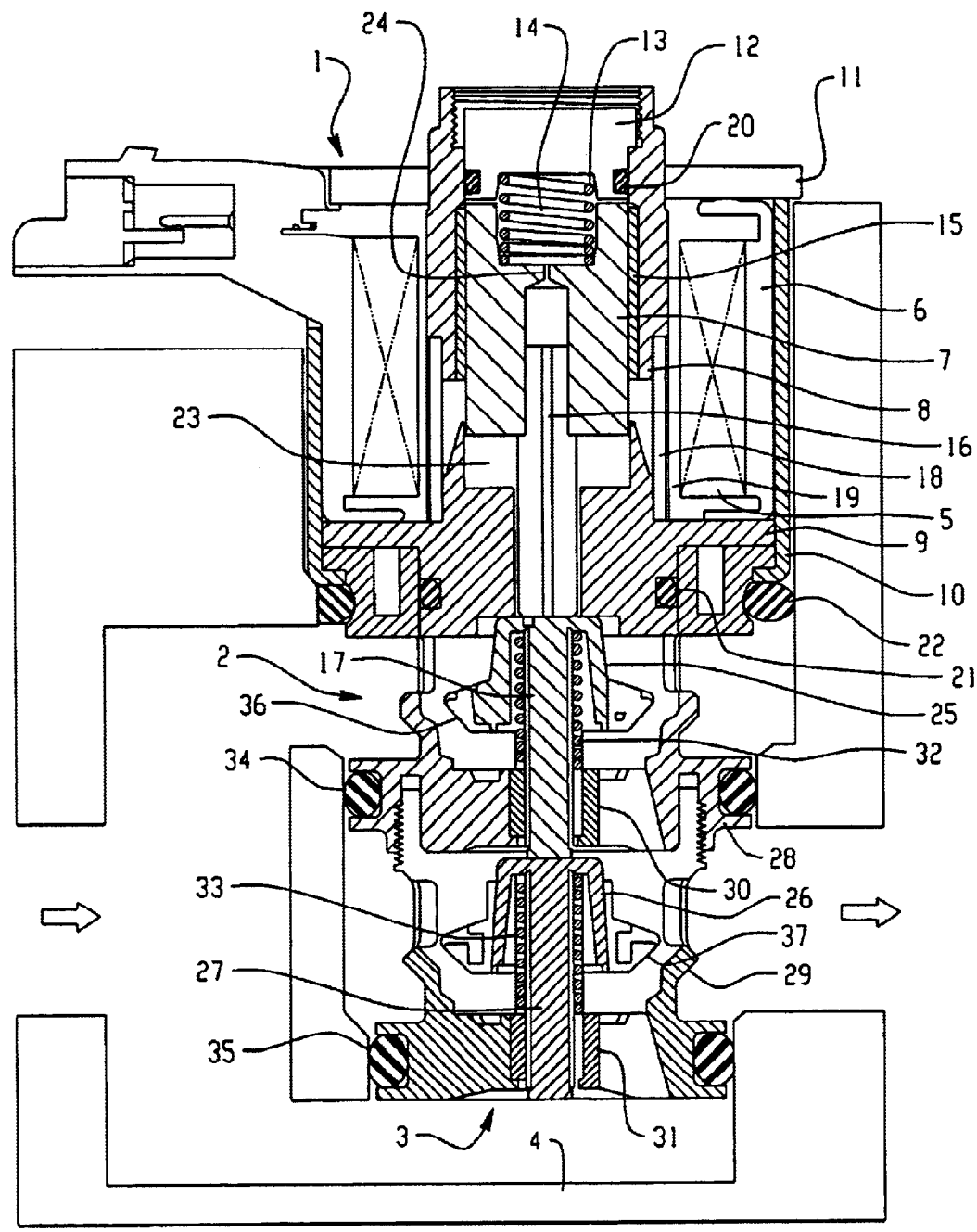
FIG. 1 shows a solenoid valve viewed in section, in its two-valve-shutter configuration, in the open position.
Figure 2:
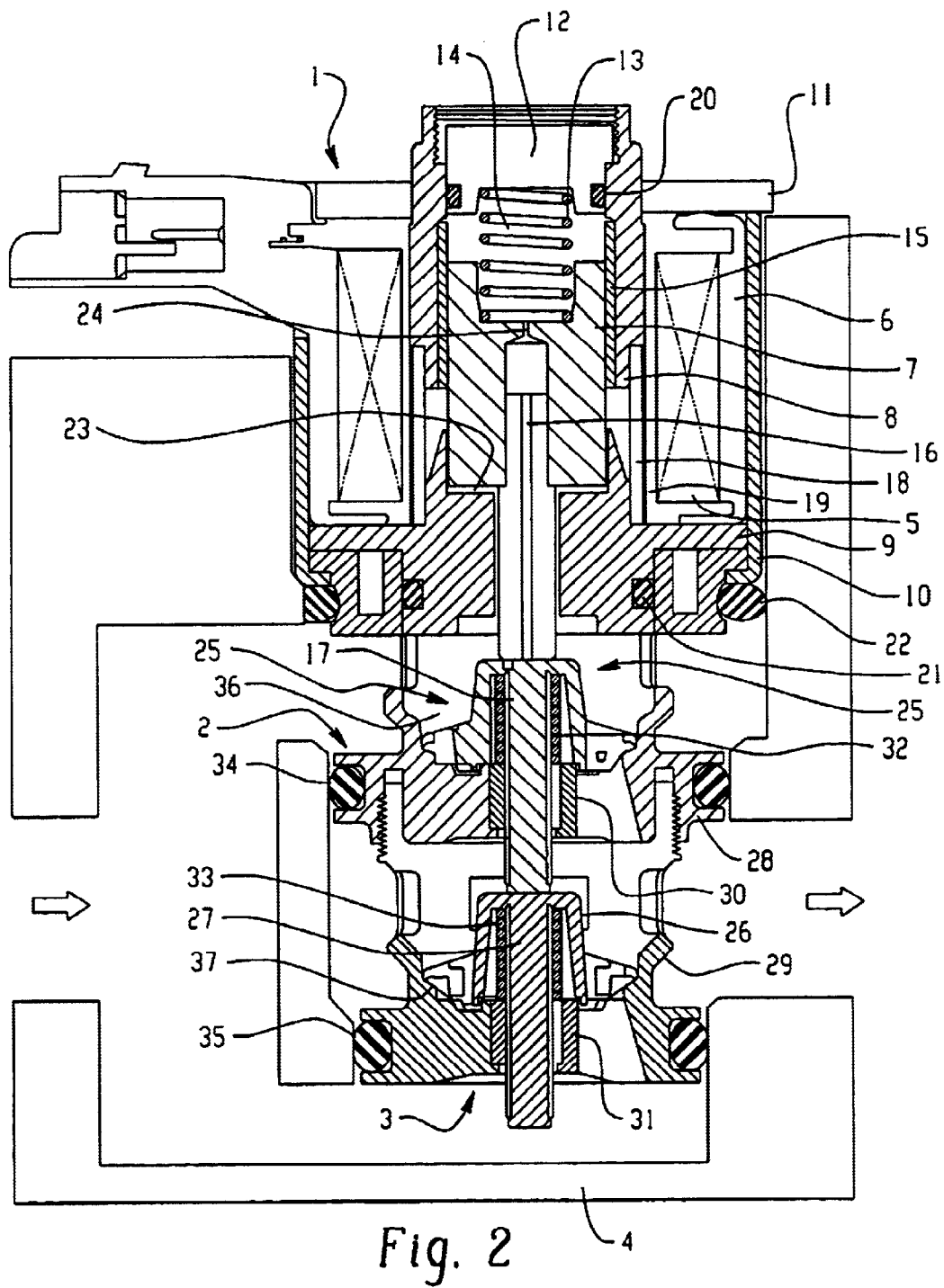
FIG. 2 is similar to FIG. 1, the solenoid valve there being depicted in the closed position.

With reference to FIGS. 1 and 2, the only difference between which lies in the state of the valve shutters, opened or closed, the solenoid valve of the invention is made up schematically of an electromagnet (1), of two shutter valves (2) and (3), all contained in a casing (4) adopting, for example, the form of a cartridge. The electromagnet (1) proper is made up of a coil (5), at the periphery of which there is an overmolded jacket (6) and which collaborates with a magnetic circuit made up of the following elements: a moving core plunger (7) axially surrounded by two pole pieces, namely a upper pole piece (8) and a lower pole piece (9), an external magnetic field frame (10), all held in place by a flange (11).

The magnetic core plunger (7) can be calibrated using a calibrating screw (12) that compresses/decompresses a spring (13) inserted in the cylindrical-shaped housings made respectively in the moving core plunger (7) and the screw (12), and that together form a chamber known as the upper chamber (14).

The moving core plunger (7) is separated from the upper pole piece (8) by a ring (15) intended to facilitate the sliding movement of one with respect to the other.

The moving core plunger (7) exhibits, protruding from its opposite end to the one that has the spring (13), a pushrod (16) that slides inside the lower pole piece (9) and collaborates with the upper part of the valve shutter (2) adjacent to the electromagnet (1), via point contact between its end and the upper end of the shaft (17) of said valve shutter (2).

The electromagnet (1) is also made up of other conventional functional elements of the following type: tube (18), field frame (19) and various operating seals. Thus, a seal (20) is placed between the calibrating screw (12) and the pole piece (8). In addition, in the lower part, the lower pole piece (9) has a housing designed to accommodate an O-ring (21) providing sealing with the lower structure of the electromagnet. Another seal (22), also an O-ring, separates the latter from the outer casing (4).

The function of these seals is to provide sealing because cooling liquid circulates inside the electromagnet. This liquid actually occupies the upper chamber (14) of the electromagnet and the volume between the moving core plunger (8) and the lower pole piece, defining the lower chamber (23) of the electromagnet.

It is particularly used as a means of filtering out external mechanical vibrations applied to the device of the invention, by means of there being a duct or hydraulic restriction (24) connecting the upper chamber (14) to the lower chamber (23). The external vibrations cannot therefore impact on the core plunger, because the passage of the fluid from one chamber to the other when these vibrations occur slows said core plunger (7) which is prevented from reflecting said vibrations in the form of axial movements.

The moving assembly of the electromagnet (1) which assembly consists of the moving core plunger (8) and of the pushrod (16) obviously has the function of moving the valves (2) and (3), each consisting of a valve shutter (25, 26) attached to an axial shaft (17, 27), said shaft sliding in the central body (28, 29) of each of the valve shutters (2, 3) in which body there is, in particular, the seat of each of these valves. The central part of said bodies (28, 29), in which part the shafts (17, 27) slide, is in fact in the form of a ring (30, 31) on which there rests the spring (32, 33) holding the valve shutter (25, 26) away from the seat in the valve body (28, 29).

These bodies (28, 29) have an external housing able to accommodate O-rings (34, 35) providing sealing between said bodies (28, 29) and the casing (4) and assisting with the fitting thereof.

It should be noted that the portion of the peripheral surface of the valve shutters (25, 26) that is intended to come into contact with the seat of the valve body (28, 29) is fitted with an overmolded elastic seal (36, 37) providing a very small flow rate of cooling liquid when the device is in the closed position.

The black arrows indicate the passage of the fluid. The device of the invention therefore comprises three distinct groups of openings, the upper and lower groups allowing cooling liquid to enter the device, while the middle group allows the cooling liquid to leave the device.

It is of course possible to reverse the flow and therefore to use the middle group for inlet and the upper and lower groups for outlet.

The flow of liquid entering the solenoid valve through the inlet in the external body (4) at a pressure $P_1$ is split into two; part of the flow passes through the orifice formed between the body (28) of the upper valve (2) and the upper valve shutter (25) covered with the seal (36). The other part of the flow passes through the orifice formed by the body (29) of the lower valve (3) and the lower valve shutter (26) equipped with its elastomer seal (37).

The two flows then recombine before leaving the solenoid valve via the outlet in the casing (4) at a pressure $P_2$. As it passes through the solenoid valve, the fluid experiences a pressure drop $\Delta P$ due mainly to the restrictions of cross sections S formed by the orifices defined by the two seats in the two valve bodies (28, 29) and the two valve shutters (25, 26).

$$\Delta P = P_1 - P_2.$$

The hydraulic characteristic of an orifice establishes the relation between the flow rate, the differential pressure, and the size of the orifice. It is modeled through the relationship $$Q = C_q S \sqrt{2\Delta P/\rho}$$

where

Q is the volumetric flow rate passing through the orifice ($m^3/s$)

$C_q$ is the coefficient of discharge (–)

S is the passage cross section offered to the fluid by the moving restriction ($m^2$)

$\rho$ is the density of the fluid ($kg/m^3$)

$\Delta P$ is the differential pressure seen by the orifice (Pa).

This relationship dictates that, for a given pressure drop $\Delta P$, the flow rate passing through the device can be controlled by changing the passage cross section S (the variations in $C_q$ and $\rho$ being zero or negligible).

The coil is powered by an electric signal. This power signal may be of two types: either a controlled current, or a voltage chopped at a fixed frequency with control of the duty cycle for opening, using procedures known per se.

The geometry of the various parts of the electromagnetic subassembly is chosen so that, for a given amplitude of the power supply signal to the coil (5), there corresponds a relatively constant thrust force of the moving subassembly (7, 16) of the electromagnet (1) on the moving parts (17, 25, 26, 27) of the valve regardless of the magnitude of the travel. The thrust force exerted by the pushrod may in any event be controlled by varying the power supply signal.

The various elements in the moving subassembly (7, 16) of the electromagnet (1) and the moving parts (17, 25, 26, 27) of the valve are kept in contact with one another by the force exerted by the springs (32, 33). In the rest position, when the coil (5) is not powered ($I=I_0$), the moving subassembly of the electromagnet (7, 16) exerts no force on the moving subassembly (17, 25, 26, 27) of the valve, which therefore finds itself in the wide open position. When the coil (5) is powered, the moving subassembly (17, 25, 26, 27) of the valve moves, and this gives rise to a simultaneous reduction in the two orifices formed by the two seats of the two valve bodies (28, 29) and their respective valve shutters (25, 26). For a given supply ($I=I_1$), the two valve shutters (25, 26) and their seals (36, 37) come into contact with the two seats of the two valve bodies (28, 29) and this prevents liquid from flowing through the solenoid valve. For an intermediate supply current ($I=I_{int}$ with $I_0<I_{int}<I_1$) the moving subassembly (17, 25, 26, 27) of the valve places itself in an intermediate position of openness. In this intermediate position of openness, the force exerted by the moving subassembly (7, 16) of the electromagnet and its spring (13) on the moving subassembly (17, 25, 26, 27) of the valve is equal, but in the opposite direction to the force exerted by the resultant of the springs on the moving subassembly (17, 25, 26, 27) of the valve.

Control of the supply signal therefore makes it possible to control precisely the position of the two valve shutters (25, 26) with respect to their respective seat, to control the passage cross section offered to the fluid and therefore to control the volumetric flow rate of fluid passing through the device.

In the construction involving two valve shutters, the forces needed to position the moving assembly of the solenoid valve are lower through the use of a double valve shutter construction, said valve shutters being of identical sizes. In this case, the sum of the forces exerted on the moving assembly and associated with the solenoid valve inlet pressure or outlet pressure is zero.

The relationships can be written:

$$A_{sh} = A_{sb}$$

$$\Sigma F_{P1\ on\ Bm} = (P_1 \times A_{sh}) - (P_1 \times A_{sb}) = 0$$

$$\Sigma F_{P2\ on\ Bm} = (P_2 \times A_{sh}) - (P_2 \times A_{sb}) = 0$$

with:

$\Sigma F_{P1\ on\ Bm}$: sum of the forces associated with the inlet pressure applied to the moving subassembly (17, 25, 26, 27) of the valve.

$\Sigma F_{P2\ on\ Bm}$: sum of the forces associated with the outlet pressure applied to the moving subassembly (17, 25, 26, 27) of the valve.

$A_{sh}$: effective area of the top valve shutter (25).

$A_{sb}$: effective area of the lower valve shutter (26).

As an alternative, it is possible to employ a configuration in which proportional control of the flow rate of the cooling liquid is not needed. This is the configuration shown in FIG. 3 for which the device is simplified and does not require the use of a calibrating screw. In this case, the relative shape of the moving core plunger (7) and of the lower pole piece (9) in the region of the air gap is simply conical, and the curve of the increase of thrust force as a function of the decrease in distance of the air gap rises increasingly steeply as this distance decreases.

In this case, precise control over the position of the moving parts of the device in intermediate states between wide open and fully closed is not sought.

Figure 3:
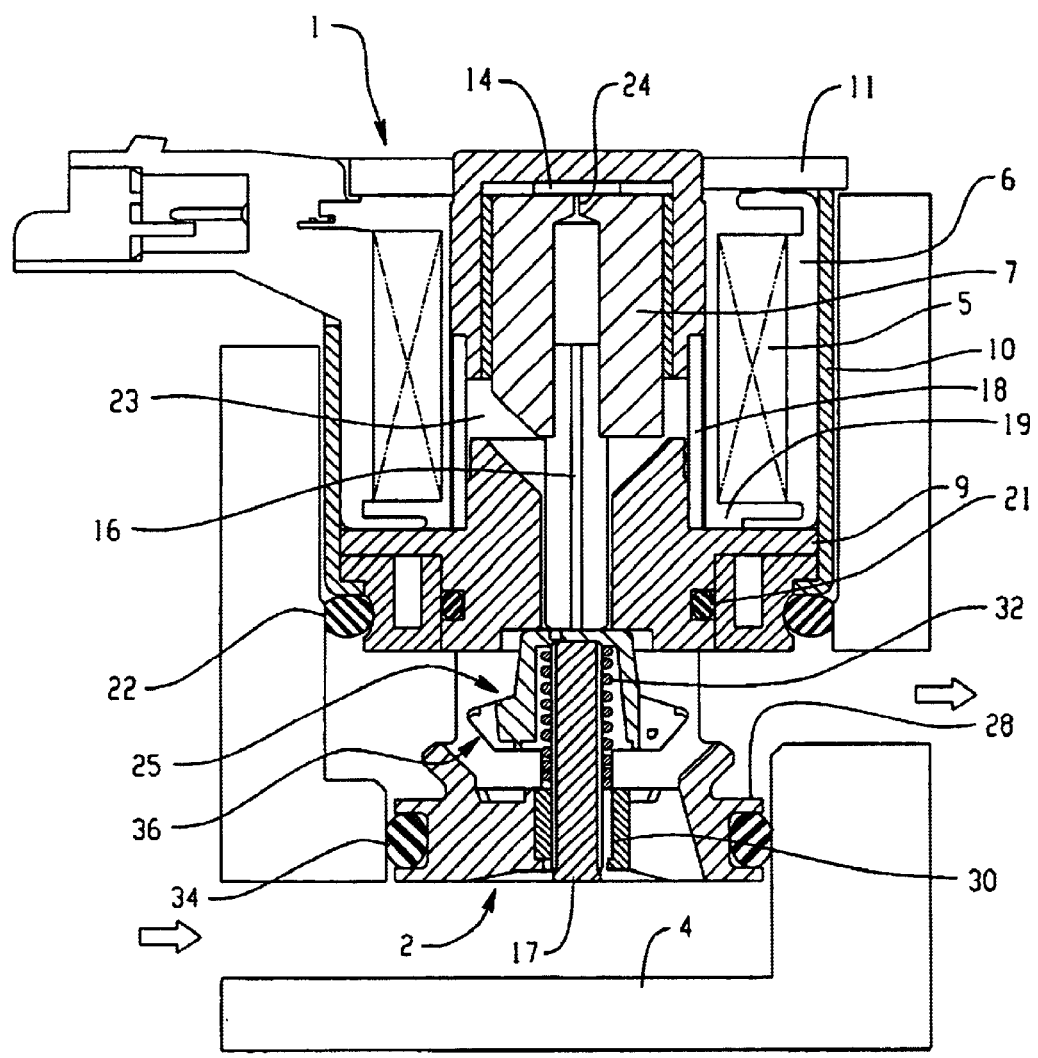
FIG. 3 depicts a configuration with just one valve shutter.

In this FIG. 3, the same references have been used for components that are identical or similar to the components featured in the preceding figures.

The examples explained hereinabove are of course not intended to limit the invention which on the contrary encompasses the alternative shapes and configurations that fall within the competence of the person skilled in the art.

What is claimed is:

1. A solenoid valve that has a response proportional to an inductor current powering an inductor coil surrounding an axially moving core plunger to which there is secured a pushrod sliding in a pole piece of the fixed magnetic circuit and collaborating with the inductor coil, actuating a valve comprising a plurality of valve shutters each collaborating with a seat disposed in a valve body so as to open and close the valve, return means providing each shutter with a stable position of rest with respect to the seat when the inductor current is zero, each valve shutter being coaxial with the pushrod and actuated by it, characterized in that the mechanical connection between the shaft of one valve shutter and the pushrod and respectively the shaft of the adjacent valve shutter is reduced to a point contact wherein the plurality of shutters move together in one direction to close the valve and move together in an opposite direction to open the valve.

2. The solenoid valve as claimed in claim 1, characterized in that the means for return consists of a coil spring arranged around the shaft of the valve shutter, in an axial housing thereof, and resting on the central part of the seat for the valve shutter.

3. The solenoid valve defined in claim 1, characterized in that the valve shutter and the valve body exhibit symmetry of revolution, the shaft of each valve shutter sliding axially in the valve body the seat of which is orientated roughly at right angles to said axis.

4. The solenoid valve defined in claim 1, characterized in that the external wall of the valve body has a peripheral housing designed to house an O-ring.

5. The solenoid valve as defined in any claim 1, characterized in that each valve shutter has an elastomer seal overmolded onto a portion of its peripheral wall which portion is designed to come into contact with the respective seat.

6. The solenoid valve defined in claim 1, characterized in that it comprises two coaxial valve shutters the valve seats of which are superposed along the axis of the pushrod.

7. The solenoid valve defined in claim 1, characterized in that the two valve shutters are kept by the return means away from their respective seats when the inductor current is zero.

8. The solenoid valve as defined in claim 1, characterized in that the two assemblies made up of the valve shutters and of their respective bodies are screwed together.

9. The solenoid valve as defined in claim 1, characterized in that the assemblies made up of the valve shutters and of their respective sets are identical and made of the same material.

10. The solenoid valve defined in claim 1, characterized in that the magnetic circuit collaborating with the inductor coil comprises, apart from the moving core plunger, two fixed pole pieces appearing to be coaxial with the core plunger, and between which the latter slides, the pole piece in which the pushrod slides and the core plunger exhibiting, in the region defining their air gap, respective shapes making it possible to obtain a thrust force that is substantially constant regardless of the distance of the air gap, for a given magnitude of the inductor current.

11. The solenoid valve defined in claim 1, characterized in that the moving magnetic core plunger has cylindrical geometry, the pole piece in which the pushrod slides being equipped on its side facing said core plunger with a cylindrical housing of a diameter greater than that of the core plunger, defining two perpendicular orientations for the air gap when the core plunger enters said housing.

12. The solenoid valve as claimed in claim 1, characterized in that the magnetic circuit collaborating with the inductor coil comprising, apart from the moving core plunger, two fixed pole pieces appearing to be coaxial with said core plunger, and between which the latter slides, the pole piece in which the pushrod slides and the moving core plunger exhibiting, in the region defining their air gap, respective shapes making it possible to obtain a thrust force that increases when the air gap distance decreases, for a given magnitude of the inductor current.

13. The solenoid valve as claimed in claim 1, characterized in that the facing surfaces belonging to the pole piece in which the pushrod slides and belonging to the moving core plunger, and defining their air gap, are of parallel appearance.

14. The solenoid valve as claimed in claim 1, characterized in that the initial position of the moving core plunger, when the inductor current is zero, can be adjusted using a screw accessible from outside the solenoid valve casing and that alters the compression of a spring arranged between it and the moving core plunger, the return force of said spring being exerted axially toward the pole piece in which the pushrod slides.

15. The solenoid valve as claimed in claim 1, characterized in that the moving core plunger comprises means for filtering out external vibrations likely to cause the moving parts to move in a way unrelated to the operating current.

16. The solenoid valve as claimed in claim 15, characterized in that said filtering means consist of an axial duct made in the moving core plunger, connecting two chambers that are defined between the latter and the fixed pole pieces, inside the coil, said chambers being filled with a cooling liquid that passes from one chamber to the other via the duct in the core plunger should the latter move.

* * * * *